United States Patent
Jennings et al.

(10) Patent No.: US 10,731,475 B2
(45) Date of Patent: Aug. 4, 2020

(54) BLADE WITH INLET ORIFICE ON AFT FACE OF ROOT

(71) Applicant: United Technologies Corporation, Farmington, CT (US)

(72) Inventors: Timothy J. Jennings, West Hartford, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 134 days.

(21) Appl. No.: 15/958,056

(22) Filed: Apr. 20, 2018

(65) Prior Publication Data

US 2019/0323360 A1    Oct. 24, 2019

(51) Int. Cl.
*F01D 5/18* (2006.01)
*F01D 5/30* (2006.01)

(52) U.S. Cl.
CPC ........... *F01D 5/187* (2013.01); *F01D 5/3007* (2013.01); *F05D 2220/32* (2013.01); *F05D 2240/35* (2013.01); *F05D 2260/221* (2013.01)

(58) Field of Classification Search
CPC . F01D 5/187; F05D 2260/221; F05D 2240/81
See application file for complete search history.

(56) References Cited

U.S. PATENT DOCUMENTS

| | | | | |
|---|---|---|---|---|
| 5,536,143 A * | 7/1996 | Jacala | ............ | F01D 5/187 416/96 R |
| 6,241,467 B1 * | 6/2001 | Zelesky | ............ | F01D 5/187 415/115 |
| 6,390,774 B1 | 5/2002 | Lewis et al. | | |
| 6,416,282 B1 * | 7/2002 | Beeck | ............ | F01D 5/087 415/115 |
| 6,416,284 B1 | 7/2002 | Demers et al. | | |
| 6,786,696 B2 | 9/2004 | Herman et al. | | |
| 8,047,787 B1 | 11/2011 | Liang | | |
| 2005/0111976 A1 * | 5/2005 | Lee | ............ | F01D 5/081 416/97 R |
| 2012/0171046 A1 | 7/2012 | Boyer | | |

FOREIGN PATENT DOCUMENTS

| | | |
|---|---|---|
| EP | 1577497 | 9/2005 |
| EP | 3085895 | 10/2016 |
| WO | 2006108764 | 10/2006 |

OTHER PUBLICATIONS

European Search Report for European Patent Application No. 19168222.8 completed Jul. 31, 2019.

* cited by examiner

*Primary Examiner* — Igor Kershteyn
*Assistant Examiner* — Brian O Peters
(74) *Attorney, Agent, or Firm* — Carlson, Gaskey & Olds, P.C.

(57) ABSTRACT

A gas turbine engine article includes a blade that has a platform, an airfoil, and a root. The platform has a gaspath side and a non-gaspath side. The airfoil extends radially from the gaspath side and defines a leading end and a trailing end. The root is configured to secure the blade. The root extends radially from the non-gaspath side of the platform. The root defines forward and aft axial faces, and a radial channel in the aft axial face. The radial channel leads to an inlet orifice in the root. A cooling passage extends in the root from the inlet orifice.

23 Claims, 5 Drawing Sheets

BLADE WITH INLET ORIFICE ON AFT FACE OF ROOT

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A gas turbine engine article according to an example of the present disclosure includes a blade that has a platform with a gaspath side and a non-gaspath side, and an airfoil extending radially from the gaspath side of the platform. The airfoil defines a leading end and a trailing end. A root is configured to secure the blade. The root extends radially from the non-gaspath side of the platform. The root defines forward and aft axial faces, and a radial channel in the aft axial face. The radial channel leads to an inlet orifice in the root, and a cooling passage extends from the inlet orifice, through the root, and into the platform.

In a further embodiment of any of the foregoing embodiments, the radial channel is straight.

In a further embodiment of any of the foregoing embodiments, the radial channel opens to a radially inner face of the root.

In a further embodiment of any of the foregoing embodiments, the root has a radial span defined as a distance from a radially inner face of the root to a trailing edge of the platform, with 0% span at the radially inner face of the root and 100% span at the trailing edge of the platform, and the inlet orifice is located at 50% span or greater.

In a further embodiment of any of the foregoing embodiments, the inlet orifice is located at 60% span to 90% span.

In a further embodiment of any of the foregoing embodiments, the cooling passage extends exclusively in the platform and in the root.

In a further embodiment of any of the foregoing embodiments, the cooling passage extends to one or more outlet orifices in the platform.

In a further embodiment of any of the foregoing embodiments, the outlet orifices open on the gaspath side of the platform, aft of the trailing end of the airfoil.

In a further embodiment of any of the foregoing embodiments, the cooling passage includes a serpentine section within the platform.

In a further embodiment of any of the foregoing embodiments, the serpentine section turns at least 180°.

A further embodiment of any of the foregoing embodiments includes a cover adjacent the aft axially face of the root, the cover including a rib that seals against the aft axial face, and wherein the rib is radially inboard of the inlet orifice.

In a further embodiment of any of the foregoing embodiments, the rib bridges across the radial channel.

A gas turbine engine according to an example of the present disclosure includes a compressor section, a combustor in fluid communication with the compressor section, and a turbine section in fluid communication with the combustor. The turbine section is coupled to drive the compressor section. The turbine section has a blade with a platform that has a gaspath side and a non-gaspath side, and an airfoil extending radially from the gaspath side of the platform. The airfoil defines a leading end and a trailing end. A root is configured to secure the blade. The root extends radially from the non-gaspath side of the platform. The root defines forward and aft axial faces, and a radial channel in the aft axial face. The radial channel leads to an inlet orifice in the root, and a cooling passage extends in the root from the inlet orifice.

In a further embodiment of any of the foregoing embodiments, the radial channel is straight and opens to a radially inner face of the root.

In a further embodiment of any of the foregoing embodiments, the root has a radial span defined as a distance from a radially inner face of the root to a trailing edge of the platform, with 0% span at the radially inner face of the root and 100% span at the trailing edge of the platform, and the inlet orifice is located at 50% span or greater.

In a further embodiment of any of the foregoing embodiments, the cooling passage extends exclusively in the platform and in the root.

In a further embodiment of any of the foregoing embodiments, the cooling passage extends to one or more outlet orifices in the platform, and the outlet orifices open on the gaspath side of the platform, aft of the trailing end of the airfoil.

In a further embodiment of any of the foregoing embodiments, the cooling passage includes a serpentine section within the platform.

A further embodiment of any of the foregoing embodiments includes a cover adjacent the aft axially face of the root, the cover including a rib that seals against the aft axial face, and wherein the rib is radially inboard of the inlet orifice and bridges across the radial channel.

A method for gas turbine engine article includes cooling a blade according to an example of the present disclosure The cooling includes feeding cooling air along the radially inner face from the forward axial face to the aft axial face, into the radial channel, from the radial channel through the inlet orifice into the cooling passage.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
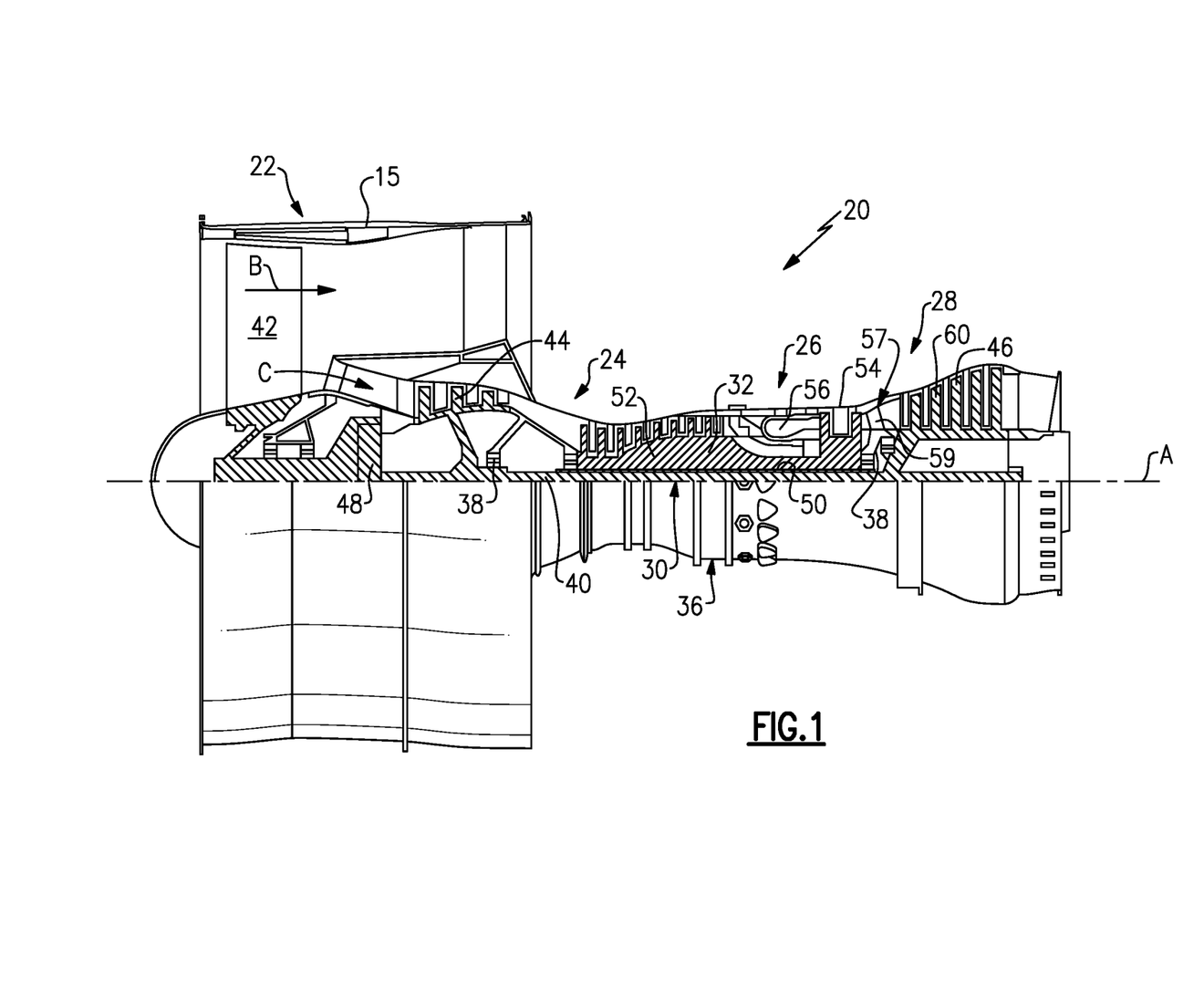
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }^\circ \text{R})/(518.7^\circ \text{R})]^{0.5}$. The "Low corrected fan tip speed" as disclosed herein according to one non-limiting embodiment is less than about 1150 ft/second.

Figure 2A:
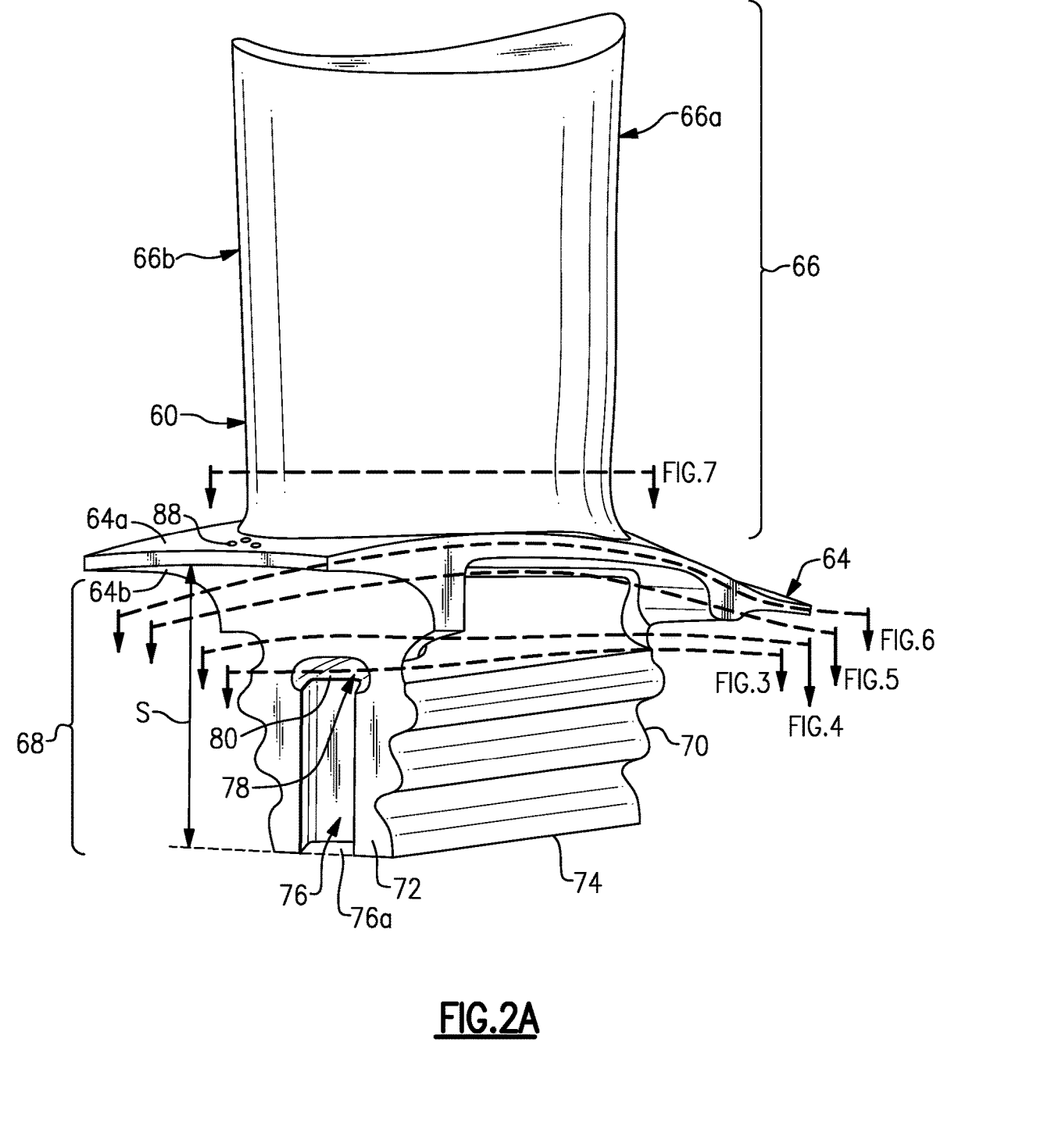
FIG. 2A illustrates an isolated view of a blade of the gas turbine engine.
Figure 2B:
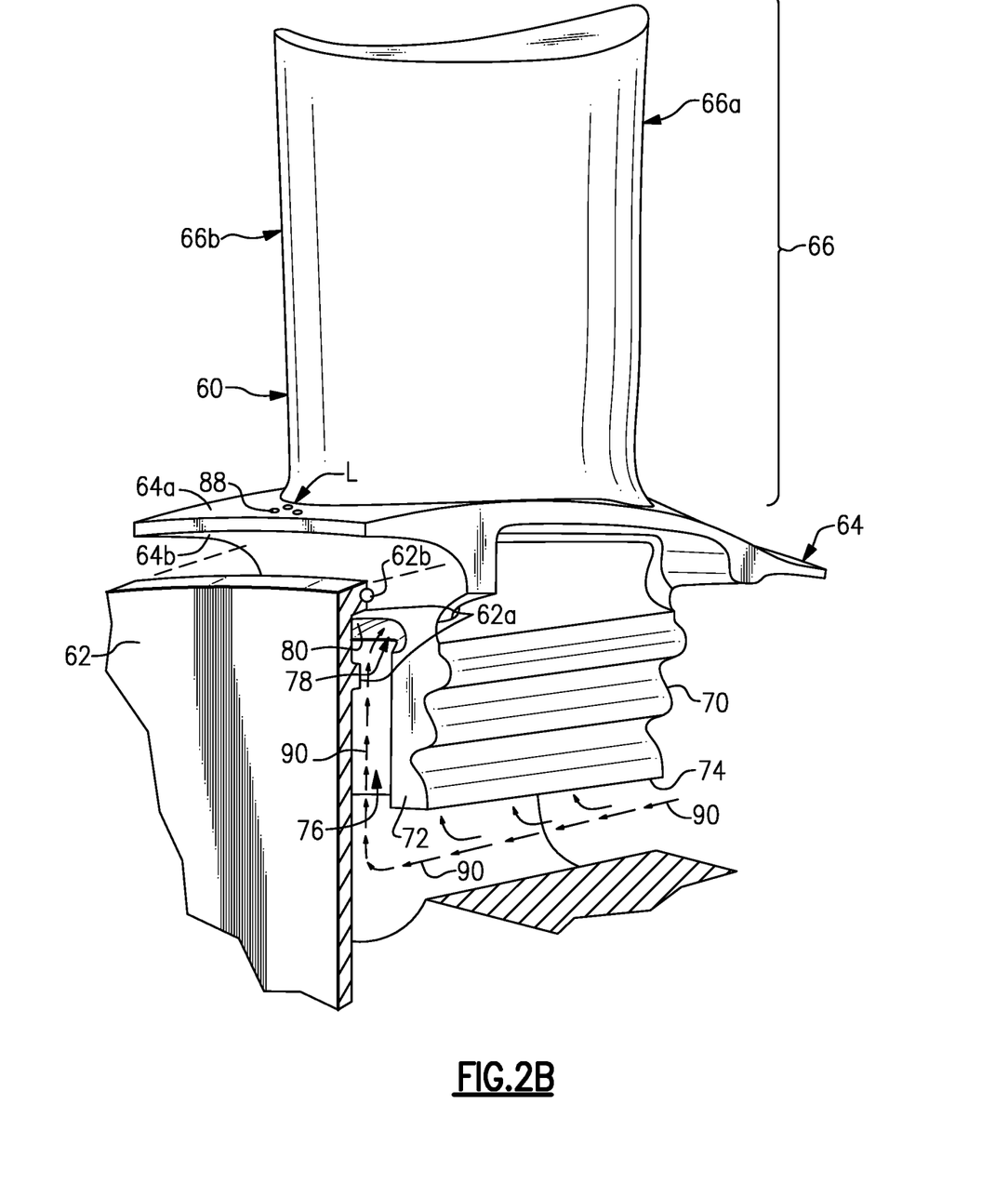
FIG. 2B illustrates the blade of FIG. 2A as well a cover that is adjacent the blade.

FIG. 2A illustrates an example blade 60 that may be used in the turbine section 28 of the engine 20. FIG. 2B also shows the blade 60, but with an adjacent cover 62. Referring to FIGS. 2A and 2B, the blade 60 includes a platform 64, an airfoil 66, and a root 68. The platform 64 defines a gaspath side 64a and a non-gaspath side 64b. The gaspath side 64a bounds a portion of the core flowpath C of the engine 20. The airfoil 66 extends radially from the gaspath side 64a. The airfoil 66 defines a leading end 66a and a trailing end 66b. As used herein, terms such as "leading," "trailing," "forward," and "aft" are made with reference to the flow of gas and combustion products through the engine 20.

The root 68 is generally configured to secure the blade 60, such as to a hub in a turbine section 28. In this regard, the root 68 may include a fir-tree geometry that interlocks in a known manner with a corresponding axial slot in the hub. The root 68 extends radially from the non-gaspath side 64b of the platform 64. The root defines a forward axial face 70, an aft axial face 72, and a radially inner face 74. The root 68 has a radial channel 76 that runs through the aft axial face 72. The radial channel 76 begins at the radially inner face 74 and terminates at an inlet orifice 78. The inlet orifice 78 leads into a cooling passage 80 within the root 68.

The radial position of the inlet orifice 78 along the aft axial face 72 may be varied. In one example, the root 68 defines a radial span, represented at S in FIG. 2B. The radial span S is the linear radial distance between the radially inner face 74 of the root 68 and the inner edge of the trailing end of the platform 64. The radial span S can be expressed as a percentage of that distance, with 0% span being at the radially inner face 74 and 100% span being at the inner edge of the trailing end of the platform 64. In the example shown, the inlet orifice 78 is located at a span of 50% or greater (i.e., the radially outboard portion of the root 68). In a further example, the inlet orifice 78 is located at a span of 60% to 90%. The location of the inlet orifice 78 in the radially outboard portion of the root facilitates fabrication of the blade 60. The channel 76 can readily be machined or cast into the root 68. However, internal passages typically require casting cores that are often quite complex and can add expense. The location of the inlet orifice 78 in the radially outboard portion of the root means that the cooling passage 80 need not extend in the radially inboard portion of the root 68, which may otherwise require a larger and more complex casting core.

In the illustrated example, the radial channel 76 is straight, such that the sides of the channel 76 are generally parallel. The channel geometry is not limited to being straight, although a straight geometry may reduce flow restriction. A non-straight channel geometry, such as a curved geometry or non-parallel side geometry may be used if flow restriction is not a concern or if the geometry does not substantially reduce flow.

The radial channel 76 extends at its radial innermost end from the radially inner face 74 of the root 68 to its radially outermost end at the inlet orifice 78. At the innermost end, the radial channel 76 opens at 76a to the radially inner face 74 of the root 68. This permits the radial channel 76 to accept cooling air that flows along the radially inner face 74 into the radial channel 76. The airflow can then travel along the radial channel 76 to the inlet orifice 78 and into the cooling passage 80. As will be appreciated, the cross-sectional area and geometry of the radial channel 76 can be varied to provide a desirable flow area for ingress of the cooling air into the inlet orifice 78.

Figure 3:
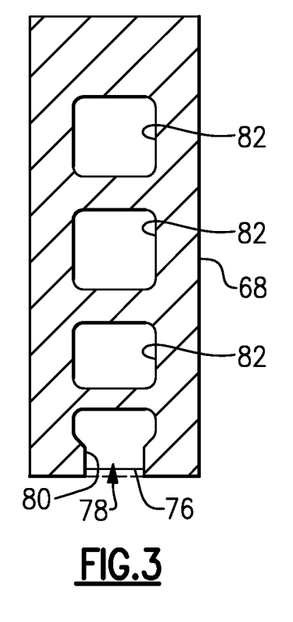
FIG. 3 illustrates a sectioned view through a root of the blade of FIG. 2A.

FIGS. 3, 4, 5, 6, and 7 depict various cross sections through the blade 60 at the section lines shown in FIG. 2A. Referring to FIG. 3, the radially outermost end of the radial channel 76 opens to the inlet orifice 78, which leads into the cooling passage 80. As shown, there are one or more additional cooling passages 82 that extend through the root 68. The cooling passages 82 are fed cooling air from other inlets that are not shown here. The cooling passages 82 are isolated within the blade 60 from the cooling passage 80. The cooling passages 82 generally extend through the platform 64 and into the airfoil 66 to provide cooling therein.

Figure 4:
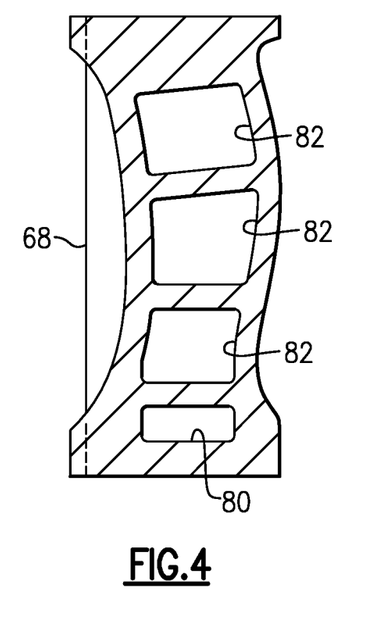
FIG. 4 illustrates another sectioned view through the root of the blade of FIG. 2A.
Figure 5:
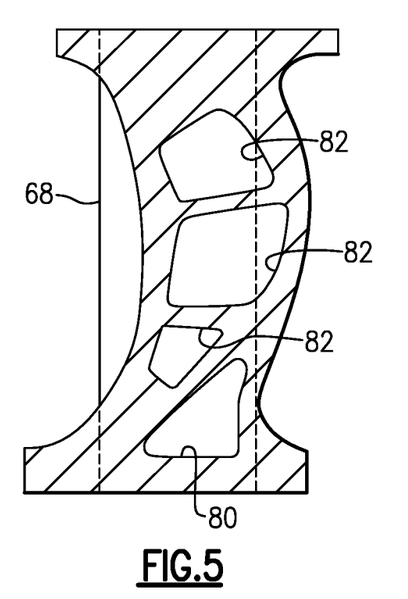
FIG. 5 illustrates a sectioned view through a platform of the blade of FIG. 2A.
Figure 6:
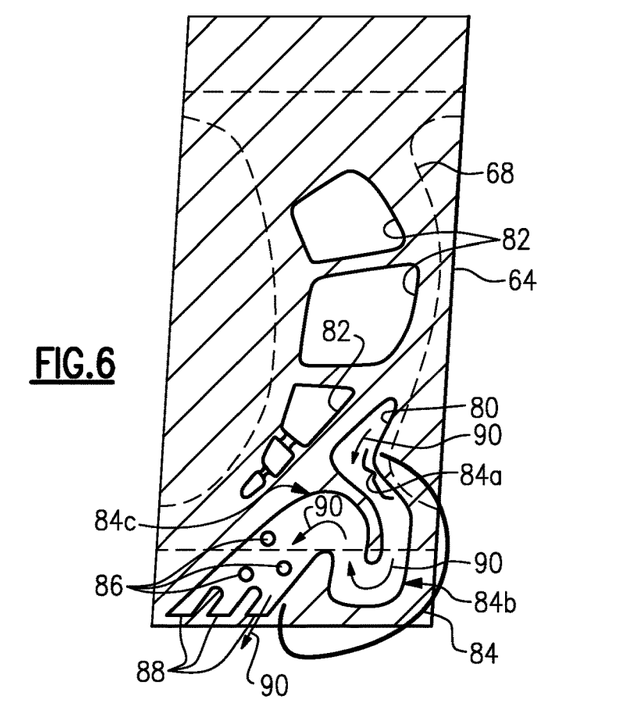
FIG. 6 illustrates another sectioned view through the platform of the blade of FIG. 2A.

Referring to FIG. 4, the illustrated leg of the cooling passage 80 extend radially outward within the root 68 until it reaches the platform 64. As shown in the cross-section through the root 68 in FIG. 5, the cooling passage 80 flares (i.e., widens) relative to the portion of the cooling passage 80 shown in FIG. 4. As shown in the cross-section through the platform 64 in FIG. 6, the flared portion of the cooling passage 80 then transitions to a serpentine section 84 that is within the platform 64. In this example, the serpentine section 84 includes a portion 84a that has a slight bend which transitions into another portion 84b that turns approximately 180° or more before transitioning into a third section 84c that turns in an aft direction toward the rear of the platform 64. The serpentine section 84 is located in an axially trailing 50% of the platform 64. In this example, there are one or more pedestals 86 disposed in the cooling passage 80 to enhance mixing and thermal transfer. Alternatively or in addition to the pedestals 84, the cooling passage 78 may include depressions, bumps or projections, trip strips, film slots, mateface holes, or the like for enhancing thermal transfer. Finally, the cooling passage 80 terminates at one or more outlet orifices 88 in the platform 64.

Figure 7:
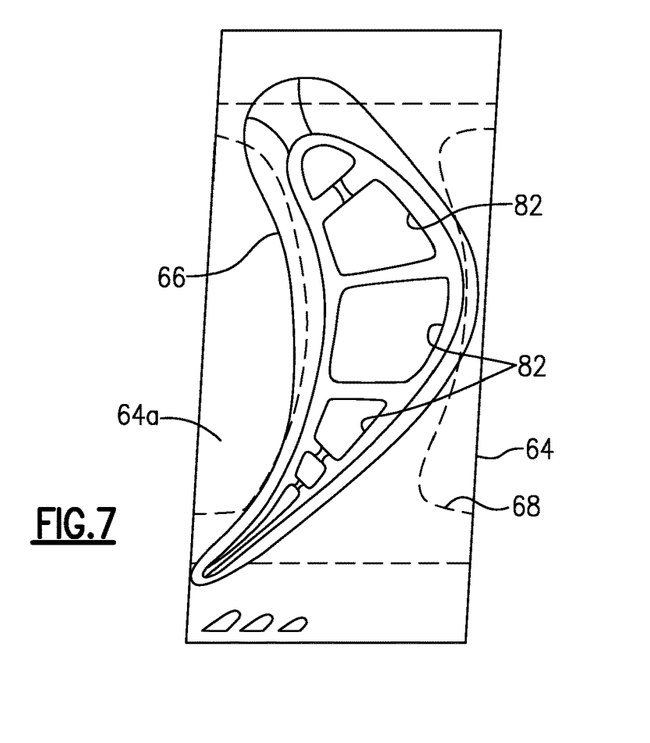
FIG. 7 illustrates a sectioned view through an airfoil of the blade of FIG. 2A.

Referring also to FIG. 7, the cooling passages 82 continue to extend radially outward into the airfoil 66 of the blade 60. The cooling passage 80, however, extends exclusively in the root 68 and platform 64 of the blade 60. Moreover, the serpentine section 84 of the cooling passage 80 permits the cooling passage 80 to wind laterally (circumferentially) back and forth within the platform 64 to provide a greater cooling effect across the circumferential width of the platform 64. It is to be understood that the configuration of the serpentine section 84 may be varied from the configuration shown. For example, the serpentine passage 84 may split into two or more sub-passages and/or contain ribs or other features for guiding flow and/or features for enhancing heat transfer.

Referring again to FIG. 2B, the cover 62 is ultimately arranged adjacent the aft axial face 72 of the root 68. In the illustration, the cover 62 is displaced from its final position, which is indicated by the dashed location lines. In this example, the cover 62 is generally flat, but includes one or more ribs 62a on its inside face that is oriented toward the aft axial face 72 of the root 68. In this example, the cover 62 includes two such ribs 62a. The upper, or radial outer, rib 62a in this example additionally includes a seal member 62b that seals across the upper portion of the root 68 above the inlet orifice 78. The lower, or radially inner, rib 62a also seals against the root 68, but bridges across the radial channel 76. That is, the lower rib 62a is radially inboard of the inlet orifice 78.

In the engine 20, cooling air, designated generally at 90 (FIG. 2B), is provided to the region of the blade 60. In this regard, a method of cooling the blade 60 includes feeding the cooling air 90 along the radially inner face 74 from the forward axial face 70 to the aft axial face 72, into the radial channel 76, from the radial channel 76 through the inlet orifice 78 into the cooling passage 80.

For example, the cooling air 90 may be bleed air from the compressor section 24 of the engine 20. In one example, the cooling air 90 is provided from a region forward of the blade 60 such that it enters the region of the blade 60 at or near the forward axial face 70. In this case, the cooling air 90 travels inboard of the blade 60 along the radially inner face 74 of the root 68. As the cooling air 90 approaches the aft axial face 72, at least a portion of the cooling air 90 flows into the radial channel 76 by way of the end of the radial channel 76 that opens to the radially inner face 74 of the root 68. The cooling air 90 is then guided by the radial channel 76 into the inlet orifice 78 and subsequently the cooling passage 80. The cooling air 90 then travels through the cooling passage 80 to thereby cool a portion of the root 68 and the platform 64 of the blade 60. Finally, the cooling air 90 is ejected from the platform 64 through the outlet orifices 88 (FIG. 6) and into the core gaspath.

As an example, the outlet orifices 88 can be located in any of a variety of different positions on the platform 64. For instance, the outlet orifices 88 may be on the axial face of the platform 64, on the gaspath side 64a of the platform 64, on the non-gaspath side of the platform 64, on the circumferential side of the platform 64, or combinations of the axial face, the gaspath side 64a, the non-gaspath side 64, and the circumferential sides. In some examples, the outlet orifices 88 may be located such that they open on the gaspath side 64a of the platform 64 at a location L aft of the airfoil 66 (see FIG. 2B). In that region, there is generally a lower pressure, which facilitates flow of the cooling air 90 for film cooling of the aft portion of the platform 64.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
   a blade including
      a platform having a gaspath side and a non-gaspath side;
      an airfoil extending radially from the gaspath side of the platform, the airfoil defining a leading end and a trailing end;
      a root configured to secure the blade, the root extending radially from the non-gaspath side of the platform, the root defining forward and aft axial faces, and a radial channel in the aft axial face, the radial channel leading to an inlet orifice in the root; and
      a cooling passage extending from the inlet orifice in the aft axial face, through the root, and into the platform.

2. The gas turbine engine article as recited in claim 1, wherein the radial channel is straight.

3. The gas turbine engine article as recited in claim 1, wherein the radial channel opens to a radially inner face of the root.

4. The gas turbine engine article as recited in claim 1, wherein the root has a radial span defined as a distance from a radially inner face of the root to a trailing edge of the platform, with 0% span at the radially inner face of the root and 100% span at the trailing edge of the platform, and the inlet orifice is located at 50% span or greater.

5. The gas turbine engine article as recited in claim 4, wherein the inlet orifice is located at 60% span to 90% span.

6. The gas turbine engine article as recited in claim 1, wherein the cooling passage extends exclusively in the platform and in the root.

7. The gas turbine engine article as recited in claim 6, wherein the cooling passage extends to one or more outlet orifices in the platform.

8. The gas turbine engine article as recited in claim 7, wherein the outlet orifices open on the gaspath side of the platform, aft of the trailing end of the airfoil.

9. The gas turbine engine article as recited in claim 6, wherein the cooling passage includes a serpentine section within the platform.

10. The gas turbine engine article as recited in claim 9, wherein the serpentine section turns at least 180°.

11. The gas turbine engine article as recited in claim 1, further comprising a cover adjacent the aft axially face of the root, the cover including a rib that seals against the aft axial face, and wherein the rib is radially inboard of the inlet orifice.

12. The gas turbine engine article as recited in claim 11, wherein the rib bridges across the radial channel.

13. A gas turbine engine comprising:
    a compressor section;
    a combustor in fluid communication with the compressor section; and
    a turbine section in fluid communication with the combustor, the turbine section being coupled to drive the compressor section, the turbine section having a blade including
      a platform having a gaspath side and a non-gaspath side,
      an airfoil extending radially from the gaspath side of the platform, the airfoil defining a leading end and a trailing end,
      a root configured to secure the blade, the root extending radially from the non-gaspath side of the platform, the root defining forward and aft axial faces, and a radial channel in the aft axial face, the radial channel leading to an inlet orifice in the root, and
      a cooling passage extending in the root from the inlet orifice in the aft axial face.

14. The gas turbine engine as recited in claim 13, wherein the radial channel is straight and opens to a radially inner face of the root.

15. The gas turbine engine as recited in claim 13, wherein the root has a radial span defined as a distance from a radially inner face of the root to a trailing edge of the platform, with 0% span at the radially inner face of the root and 100% span at the trailing edge of the platform, and the inlet orifice is located at 50% span or greater.

16. The gas turbine engine as recited in claim 13, wherein the cooling passage extends exclusively in the platform and in the root.

17. The gas turbine engine as recited in claim 16, wherein the cooling passage extends to one or more outlet orifices in the platform, and the outlet orifices open on the gaspath side of the platform, aft of the trailing end of the airfoil.

18. The gas turbine engine article as recited in claim 16, wherein the cooling passage includes a serpentine section within the platform.

19. The gas turbine engine as recited in claim 13, further comprising a cover adjacent the aft axially face of the root, the cover including a rib that seals against the aft axial face, and wherein the rib is radially inboard of the inlet orifice and bridges across the radial channel.

20. A method for gas turbine engine article, the method comprising:
    cooling a blade that includes
      a platform having a gaspath side and a non-gaspath side,
      an airfoil extending radially from the gaspath side of the platform, the airfoil defining a leading end and a trailing end,
      a root configured to secure the blade, the root extending radially from the non-gaspath side of the platform, the root defining forward and aft axial faces, and a radial channel in the aft axial face, the radial channel leading to an inlet orifice in the root, and
      a cooling passage extending in the root from the inlet orifice in the aft axial face,
    wherein the cooling of the blade includes feeding cooling air along the radially inner face from the forward axial face to the aft axial face, into the radial channel, from the radial channel through the inlet orifice into the cooling passage.

21. The gas turbine engine article as recited in claim 1, wherein the radial channel has a single exit at the inlet orifice such that cooling air in the radial channel feeds exclusively to the inlet orifice and then into the cooling passage.

22. The gas turbine engine article as recited in claim 21, wherein the radial channel is straight and has a single inlet that opens at a radially inner face of the root.

23. The gas turbine engine article as recited in claim 22, wherein the cooling passage extends exclusively in the platform and in the root, the cooling passage extends to one or more outlet orifices in the platform, and the outlet orifices are aft of the trailing end of the airfoil.

\* \* \* \* \*